United States Patent
Mohammadi et al.

(10) Patent No.: US 11,243,290 B2
(45) Date of Patent: Feb. 8, 2022

(54) FUTURE POSITION ESTIMATION FOR IMPROVED RELIABILITY OF CONNECTIVITY

(71) Applicant: NOKIA TECHNOLOGIES OY, Espoo (FI)

(72) Inventors: Jafar Mohammadi, Stuttgart (DE); Silvio Mandelli, Tamm (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/183,986

(22) Filed: Feb. 24, 2021

(65) Prior Publication Data
US 2021/0270930 A1    Sep. 2, 2021

(30) Foreign Application Priority Data

Mar. 2, 2020 (FI) ..................... 20205215

(51) Int. Cl.
*G01S 5/02* (2010.01)
*H04W 64/00* (2009.01)
*G01S 5/00* (2006.01)

(52) U.S. Cl.
CPC ............ *G01S 5/0294* (2013.01); *G01S 5/009* (2013.01); *G01S 5/0284* (2013.01); *H04W 64/006* (2013.01)

(58) Field of Classification Search
CPC ...... G01S 5/0294; G01S 5/009; G01S 5/0284; H04W 64/006
USPC ............... 455/436–445, 456.1–457; 370/331
See application file for complete search history.

(56) References Cited

U.S. PATENT DOCUMENTS

| | | | |
|---|---|---|---|
| 2005/0079877 A1 | 4/2005 | Ichimura | |
| 2006/0235997 A1* | 10/2006 | Munirajan | H04L 61/2092 709/245 |
| 2011/0310866 A1 | 12/2011 | Kennedy et al. | |
| 2015/0003265 A1 | 1/2015 | Mansour | |
| 2015/0065174 A1* | 3/2015 | Lee | H04W 4/029 455/456.3 |
| 2015/0149591 A1 | 5/2015 | Gibbon et al. | |
| 2016/0323756 A1* | 11/2016 | Shen | H04B 7/0617 |
| 2016/0329636 A1* | 11/2016 | Larsson | G01S 5/0072 |

(Continued)

FOREIGN PATENT DOCUMENTS

| | | |
|---|---|---|
| EP | 1028598 A1 | 8/2000 |
| EP | 2819470 A1 | 12/2014 |

(Continued)

OTHER PUBLICATIONS

Office Action and Search Report dated Jun. 3, 2020 corresponding to Finnish Patent Application No. 20205215.

(Continued)

*Primary Examiner* — Michael Y Mapa
(74) *Attorney, Agent, or Firm* — Squire Patton Boggs (US) LLP (57) ABSTRACT

Disclosed is a method comprising obtaining one or more future position estimates of a terminal device, and transmitting the one or more future position estimates to a base station and/or to a location management function, wherein the one or more future position estimates are transmitted in a message comprising a list of one or more pairs of a timestamp and an estimated future position at a time indicated by the timestamp.

19 Claims, 6 Drawing Sheets

(56) References Cited

U.S. PATENT DOCUMENTS

2017/0142555 A1* 5/2017 Ljung .................. H04W 4/027
2019/0199419 A1* 6/2019 Teslenko ............... H04W 4/029

FOREIGN PATENT DOCUMENTS

| JP | 2000-217138 A | 8/2000 |
| JP | 2005-072865 A | 3/2005 |
| JP | 2015-509630 A | 3/2015 |
| JP | 2020-503906 A | 2/2020 |
| WO | WO 2018/064627 A1 | 4/2018 |
| WO | WO 2018/113974 A1 | 6/2018 |

OTHER PUBLICATIONS

Communication of Acceptance under section 29a of Patents Decree dated Oct. 12, 2020 corresponding to Finnish Patent Application No. 20205215.
3GPP TS 36.355 V16.0.0 (Jul. 2020), Technical Specification, 3rd Generation Partnership Project; Technical Specification Group Radio Access Network; Evolved Universal Terrestrial Radio Access (E-UTRA); LTE Positioning Protocol (LPP) (Release 16), Jul. 2020.
Extended European Search Report dated Jun. 11, 2021 corresponding to European Patent Application No. 21158090.7.
Notification of Ground of Rejection dated May 18, 2021 corresponding to Japanese Patent Application No. 2021-026918, with English translation thereof.

* cited by examiner

FUTURE POSITION ESTIMATION FOR IMPROVED RELIABILITY OF CONNECTIVITY

FIELD

The following exemplary embodiments relate to reliability of connectivity in a cellular communication network.

BACKGROUND

As resources are limited, it is desirable to optimize the usage of network resources. A cell in a cellular communication network may be utilized such that better service may be provided to one or more terminal devices. The optimization of the usage of one or more cells may therefore enable better usage of resources and enhanced user experience to a user of a terminal device.

SUMMARY

The scope of protection sought for various exemplary embodiments is set out by the independent claims. The exemplary embodiments and features, if any, described in this specification that do not fall under the scope of the independent claims are to be interpreted as examples useful for understanding various exemplary embodiments.

According to an aspect, there is provided an apparatus comprising means for obtaining one or more future position estimates of a terminal device, and transmitting the one or more future position estimates to a base station and/or to a location management function, wherein the one or more future position estimates are transmitted in a message comprising a list of one or more pairs of a timestamp and an estimated future position at a time indicated by the timestamp.

According to another aspect, there is provided an apparatus comprising at least one processor, and at least one memory including computer program code, wherein the at least one memory and the computer program code are configured, with the at least one processor, to cause the apparatus to: obtain one or more future position estimates of a terminal device, and transmit the one or more future position estimates to a base station and/or to a location management function, wherein the one or more future position estimates are transmitted in a message comprising a list of one or more pairs of a timestamp and an estimated future position at a time indicated by the timestamp.

According to another aspect, there is provided an apparatus comprising means for receiving one or more future position estimates of a terminal device, wherein the one or more future position estimates are received in a message comprising a list of one or more pairs of a timestamp and an estimated future position at a time indicated by the timestamp, and predicting a future position of the terminal device based on the one or more future position estimates.

According to another aspect, there is provided an apparatus comprising at least one processor, and at least one memory including computer program code, wherein the at least one memory and the computer program code are configured, with the at least one processor, to cause the apparatus to: receive one or more future position estimates of a terminal device, wherein the one or more future position estimates are received in a message comprising a list of one or more pairs of a timestamp and an estimated future position at a time indicated by the timestamp, and predict a future position of the terminal device based on the one or more future position estimates.

According to another aspect, there is provided an apparatus comprising at least one processor, and at least one memory including computer program code, wherein the at least one memory and the computer program code are configured, with the at least one processor, to cause the apparatus to: receive one or more future position estimates of a terminal device, wherein the one or more future position estimates are received in a message comprising a list of one or more pairs of a timestamp and an estimated future position at a time indicated by the timestamp, predict a future position of the terminal device based on the one or more future position estimates, and perform beam tracking for the terminal device based on the predicted future position of the terminal device.

According to another aspect, there is provided an apparatus comprising at least one processor, and at least one memory including computer program code, wherein the at least one memory and the computer program code are configured, with the at least one processor, to cause the apparatus to: receive one or more future position estimates of a terminal device, wherein the one or more future position estimates are received in a message comprising a list of one or more pairs of a timestamp and an estimated future position at a time indicated by the timestamp, predict a future position of the terminal device based on the one or more future position estimates, estimate a signal strength at the predicted future position, and, if the estimated signal strength at the predicted future position is estimated to be less than a current signal strength, transmit data to the terminal device before the terminal device is predicted to arrive at the predicted future position.

According to another aspect, there is provided an apparatus comprising at least one processor, and at least one memory including computer program code, wherein the at least one memory and the computer program code are configured, with the at least one processor, to cause the apparatus to: receive one or more future position estimates of a plurality of terminal devices, wherein the one or more future position estimates are received in one or more messages comprising a list of one or more pairs of a timestamp and an estimated future position at a time indicated by the timestamp, predict one or more future positions of the plurality of terminal devices based on the one or more future position estimates, and predict a network load based on the predicted one or more future positions of the plurality of terminal devices.

According to another aspect, there is provided a system comprising a terminal device and a network entity, wherein the terminal device is configured to: obtain one or more future position estimates of the terminal device, and transmit the one or more future position estimates to the network entity in a message comprising a list of one or more pairs of a timestamp and an estimated future position at a time indicated by the timestamp; and wherein the network entity is configured to: receive the one or more future position estimates transmitted by the terminal device, and predict a future position of the terminal device based on the one or more future position estimates.

According to another aspect, there is provided a system comprising a terminal device and a base station, wherein the terminal device is configured to: obtain one or more future position estimates of the terminal device, and transmit the one or more future position estimates to the base station in a message comprising a list of one or more pairs of a timestamp and an estimated future position at a time indicated by the timestamp; and wherein the base station is configured to: receive the one or more future position estimates transmitted by the terminal device, and predict a future position of the terminal device based on the one or more future position estimates.

According to another aspect, there is provided a system comprising a terminal device and a location management function, wherein the terminal device is configured to: obtain one or more future position estimates of the terminal device, and transmit the one or more future position estimates to the location management function in a message comprising a list of one or more pairs of a timestamp and an estimated future position at a time indicated by the timestamp; and wherein the location management function is configured to: receive the one or more future position estimates transmitted by the terminal device, and predict a future position of the terminal device based on the one or more future position estimates.

According to another aspect, there is provided a method comprising obtaining one or more future position estimates of a terminal device, and transmitting the one or more future position estimates to a base station and/or to a location management function, wherein the one or more future position estimates are transmitted in a message comprising a list of one or more pairs of a timestamp and an estimated future position at a time indicated by the timestamp.

According to another aspect, there is provided a computer program comprising instructions for causing an apparatus to perform at least the following: obtain one or more future position estimates of a terminal device, and transmit the one or more future position estimates to a base station and/or to a location management function, wherein the one or more future position estimates are transmitted in a message comprising a list of one or more pairs of a timestamp and an estimated future position at a time indicated by the timestamp.

According to another aspect, there is provided a computer readable medium comprising program instructions for causing an apparatus to perform at least the following: obtain one or more future position estimates of a terminal device, and transmit the one or more future position estimates to a base station and/or to a location management function, wherein the one or more future position estimates are transmitted in a message comprising a list of one or more pairs of a timestamp and an estimated future position at a time indicated by the timestamp.

According to another aspect, there is provided a non-transitory computer readable medium comprising program instructions for causing an apparatus to perform at least the following: obtain one or more future position estimates of a terminal device, and transmit the one or more future position estimates to a base station and/or to a location management function, wherein the one or more future position estimates are transmitted in a message comprising a list of one or more pairs of a timestamp and an estimated future position at a time indicated by the timestamp.

BRIEF DESCRIPTION OF THE DRAWINGS

In the following, various exemplary embodiments will be described in greater detail with reference to the accompanying drawings, in which.

DETAILED DESCRIPTION

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

In the following, different exemplary embodiments will be described using, as an example of an access architecture to which the exemplary embodiments may be applied, a radio access architecture based on long term evolution advanced (LTE Advanced, LTE-A) or new radio (NR, 5G), without restricting the exemplary embodiments to such an architecture, however. It is obvious for a person skilled in the art that the exemplary embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
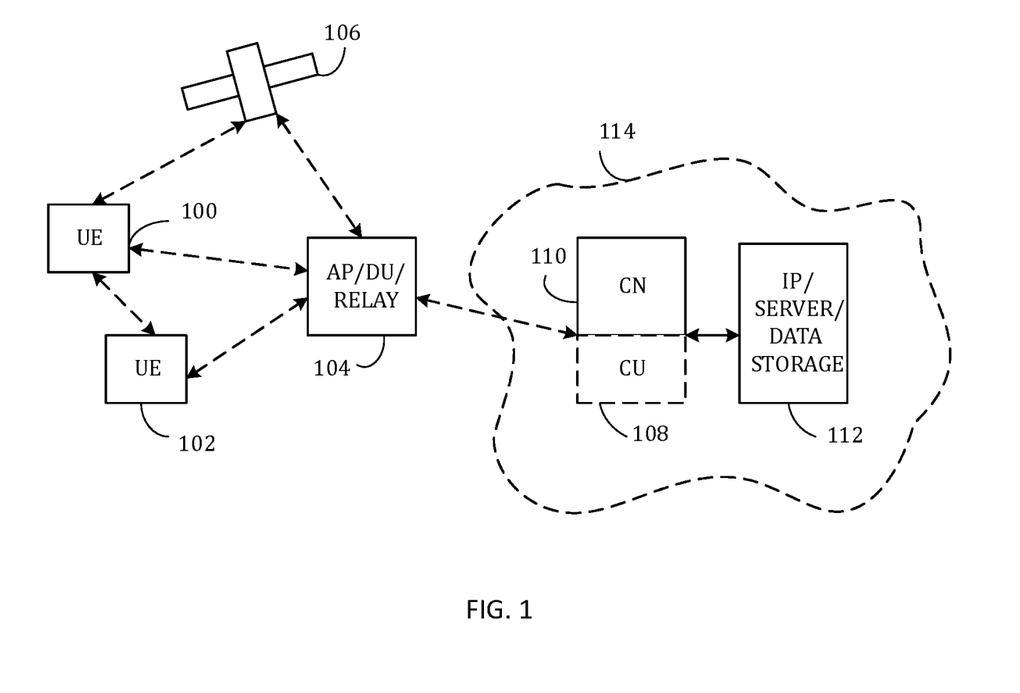
FIG. 1 illustrates an exemplary embodiment of a cellular communication network.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The exemplary embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 configured to be in a wireless connection on one or more communication channels in a cell with an access node (such as (e/g)NodeB) 104 providing the cell. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage.

A communication system typically comprises more than one (e/g)NodeB in which case the (e/g)NodeBs may also be configured to communicate with one another over links, wired or wireless, designed for the purpose. These links may be used for signaling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device may also utilize cloud. In some applications, a user device may comprise a small portable device with radio parts (such as a watch, earphones or eyeglasses) and the computation is carried out in the cloud. The user device (or in some exemplary embodiments a layer 3 relay node) is configured to perform one or more of user equipment functionalities. The user device may also be called a subscriber unit, mobile station, remote terminal, access terminal, user terminal, terminal device, or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input—multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being integradable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz—cmWave, below 6 GHz—cmWave—mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NVF)

and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (loT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). Each satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

Millimeter waves, mmWaves, may be defined as the band of radio frequencies between 30 GHz and 300 GHz, i.e. having a wavelength range between 1 mm and 10 mm. mmWave carrier frequencies may be used for fulfilling the high data rate requirements envisioned in wireless communication systems, in particular in 5G systems, due to the possibility of exploiting the large spectral channels available on those frequencies. mmWave-based wireless communication systems may use narrow directional beams, which may benefit from estimating the future position and/or trajectory of a terminal device.

Furthermore, in a wireless communication system, uncertainty and errors may be caused for example by an unpredictable channel, which may be affected for example by the position and speed of a terminal device. Therefore, the reliability of connectivity in a wireless communication system may be improved by estimating the future position and/or trajectory of the terminal device.

Figure 2:
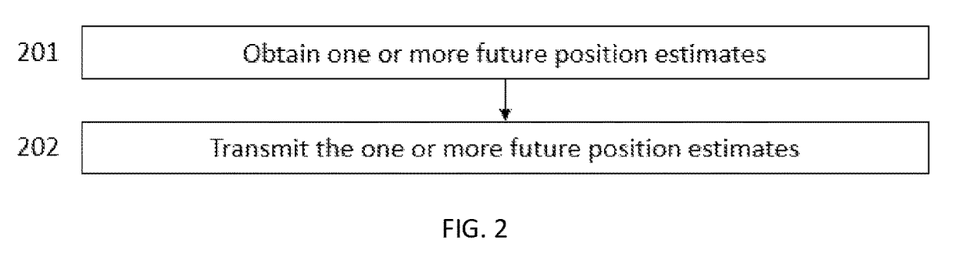
FIG. 2 illustrates a flow chart according to an exemplary embodiment.

FIG. 2 illustrates a flow chart according to an exemplary embodiment. An apparatus, such as a terminal device, may comprise means for or be configured to perform the steps of FIG. 2. In step 201, the terminal device obtains one or more future position estimates of the terminal device. A future position may be defined as a position that the terminal device will be physically located at during a point in time later than the current time. The one or more future position estimates may be obtained for example from a navigation application running on the terminal device in order to determine the long-term path of the terminal device. For example, the one or more future position estimates may extend at least 5 seconds into the future. Alternatively, the one or more future position estimates may be obtained from a third-party service, for example a cloud-based location service. The one or more future position estimates may be referred to herein as long-term future position information, LFPI. The LFPI may comprise for example a direction in angles and a distance in meters, and/or a geographic longitude and latitude position.

In step 202, the LFPI is transmitted to one or more base stations, for example a gNB, and/or to a location management function, LMF, configured to receive the LFPI. The LMF may be a network entity that manages positioning for the terminal device. The LFPI may be transmitted for example in a dedicated message in a positioning related protocol of a current or future wireless standard, for example the LTE positioning protocol, LPP, of 4G, or a future NR positioning protocol. The LFPI may be transmitted for example in an LPP message by adding one or more new fields into the ProvideLocationInformation message body of an LPP message specified for example in TS 36.355. The ProvideLocationInformation message body of an LPP message may be used by a terminal device to provide position measurements or position estimates to a base station and/or LMF. The LFPI may be transmitted for example in a message comprising one or more of the following fields:
  i. LFPI-Length: an integer comprising the number of list elements that are shared
  ii. LFPI-List: a list of LFPI-Length pairs comprising:
    a. LFPI-List-Time: a timestamp of an estimated future position of the terminal device
    b. LFPI-List-Location: an estimated future position of the terminal device at a time indicated by LFPI-List-Time Similarly, the LMF may further transmit this information to a base station of the network, and also communicate an identifier of the terminal device that has transmitted the LFPI. Alternatively, the terminal device may directly communicate its LFPI to the base station with ad-hoc signaling for example every few seconds.

The resolution of the LFPI may be arbitrarily chosen by the terminal device, or signaled by the LMF. Furthermore, it may be beneficial to periodically update the LFPI in order to recover from possible deviations from the planned route, for example due to traffic or user error, and transmit the updated LFPI.

Figure 3:
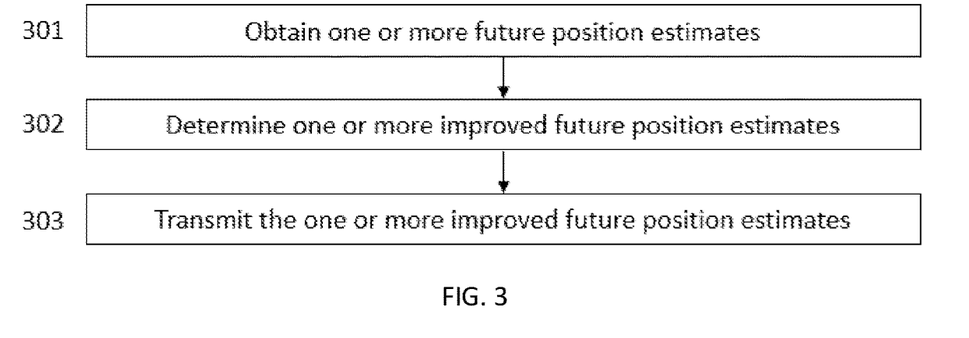
FIG. 3 illustrates a flow chart according to an exemplary embodiment.

FIG. 3 illustrates a flow chart according to an exemplary embodiment. In step 301, a terminal device obtains one or more future position estimates, i.e. LFPI, of the terminal device. The one or more future position estimates may be obtained for example from a navigation application running on the terminal device. In step 302, the LFPI is combined with a trajectory estimation obtained for example from particle filtering or Kalman filtering in order to improve the accuracy of the future position estimates, i.e. to obtain one or more improved future position estimates. In step 303, the one or more improved future position estimates are transmitted to one or more base stations, for example a gNB, and/or to an LMF.

It should be noted that the above exemplary embodiment is different from map matching, wherein static road maps may be used to assist the estimation of the position. For example, map matching may not use LFPI from a navigation application to estimate the trajectory of the terminal device. However, in some exemplary embodiments the one or more improved future position estimates may be combined with map matching.

Figure 4:
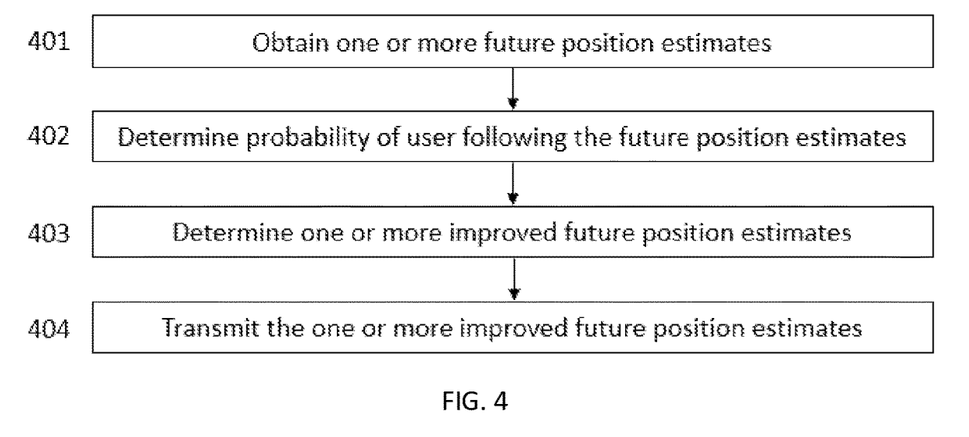
FIG. 4 illustrates a flow chart according to an exemplary embodiment.

FIG. 4 illustrates a flow chart according to an exemplary embodiment. In step 401, a terminal device obtains one or more future position estimates, i.e. LFPI, of the terminal device. The one or more future position estimates may be obtained for example from a navigation application running on the terminal device. In step 402, a score referred to herein as the user behavior factor, UBF, is determined. The UBF indicates a probability of how likely the user of the terminal device is to follow the predicted route, i.e. the LFPI. In other words, the UBF indicates a probability for the terminal device being physically located at the one or more future position estimates at the estimated time. The UBF may be determined for example by using historical data to calculate the ratio of times that the terminal device has followed the LFPI to the total time in a given time window. The UBF may be determined for a specific terminal device and stored on the terminal device. The UBF may be shared with the LMF, when the terminal device appears in the cell. The neighboring cells may also share the UBF of the terminal device. The UBF may be for example a scalar value between 0 and 1, wherein 0 means no trust in the LFPI and 1 means full trust in the LFPI. In step 403, one or more improved future position estimates are determined. The UBF may be used as a weight to combine the LFPI and other techniques, such as particle filtering and/or Kalman filtering. In other words, the UBF may be used as a weight to combine at least two future position estimates relating to the same time instant into an improved future position estimate. For example, an improved future position estimate may be determined with:

$$X_{improved} = (UBF) * X_{LFPI} + (1-UBF) * X_{other}$$

where $X_{improved}$ is the improved future position estimate, $X_{LFPI}$ is a future position estimate from LFPI, and $X_{other}$ is a future position estimate obtained from another technique, such as particle filtering or Kalman filtering. In step 404, the one or more improved future position estimates are transmitted to one or more base stations, for example a gNB, and/or to an LMF.

In another exemplary embodiment, two or more different future position estimates of a terminal device relating to the same time instant may be used without combining them into an improved future position estimate. The two or more future position estimates may be weighted with a UBF or they may be unweighted. For example, a base station such as a gNB may prepare handovers for the terminal device with two or more other cells based on the two or more future position estimates, as the two or more future position estimates may be in the range of different cells.

In another exemplary embodiment, an apparatus, for example comprising a base station, such as a gNB, or an LMF, may comprise means for or be configured to receive one or more future position estimates of a terminal device, wherein the one or more future position estimates are received in a message comprising a list of one or more pairs of a timestamp and an estimated future position at a time indicated by the timestamp, and to predict a future position of the terminal device based on the one or more future position estimates. The apparatus may then use the predicted future position of the terminal device to optimize the usage of network resources. For example, the apparatus may transmit a signal to the predicted future position of the terminal device at the time, or approximately at the time, indicated by the corresponding timestamp in order to for example reduce beam sweeping, and/or the apparatus may predict one or more handovers associated with the terminal device based on the predicted future position of the terminal device. Furthermore, the apparatus may for example estimate network performance, for example signal strength, at the predicted future position of the terminal device. If the network performance is estimated to be poor, for example less than the current network performance, at the predicted future position, the apparatus may transmit data to the terminal device in advance before the terminal device is predicted to arrive at the predicted future position in order to prevent a service outage. The transmitted data may be data that otherwise would have been scheduled to be transmitted at the time when the terminal device is predicted to be at the predicted future position with poor network performance.

In another exemplary embodiment, an apparatus, for example comprising a base station, such as a gNB, or an LMF, may comprise means for or be configured to receive one or more future position estimates of a plurality of terminal devices, wherein the one or more future position estimates are received in a message comprising a list of one or more pairs of a timestamp and an estimated future position at a time indicated by the timestamp. The apparatus may receive separate messages for example from individual terminal devices, or the apparatus may receive a combined message comprising one or more future position estimates for the plurality of terminal devices. The apparatus may then predict one or more future positions of the plurality of terminal devices based on the one or more future position estimates. The apparatus may further use the predicted one or more future positions of the plurality of terminal device to optimize the usage of network resources. For example, the apparatus may predict network load based on the predicted one or more future positions of the plurality of terminal devices, and perform network load balancing based on the predicted network load.

Figure 5:
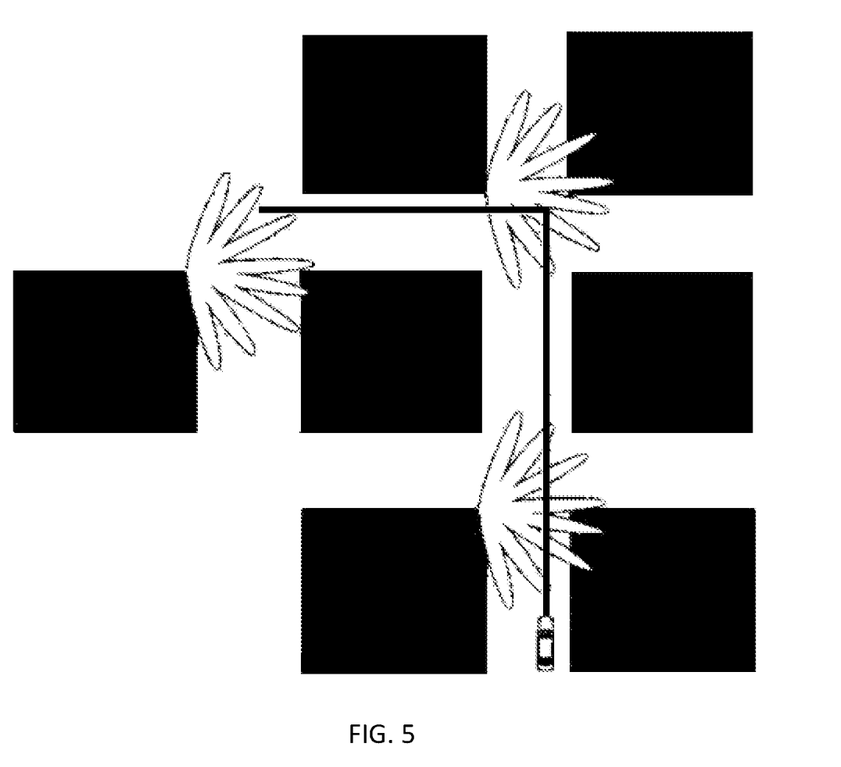
FIG. 5 illustrates an exemplary embodiment utilizing beam management.

FIG. 5 illustrates an exemplary embodiment utilizing beam management. In the exemplary embodiment, the future route of a terminal device may be known, and the route information may be provided to a network entity, for example to a base station such as a gNB, as one or more future position estimates of the terminal device. The base station may then use the one or more future position estimates for example to predict which beam should be selected next for the terminal device, and/or to predict what content should be available for pre-caching in the next base station. By using the one or more future position estimates of the terminal device for example for beam management, beam sweeping for finding the terminal device may be reduced, thus resulting in more efficient use of the resources of the network.

Figure 6:
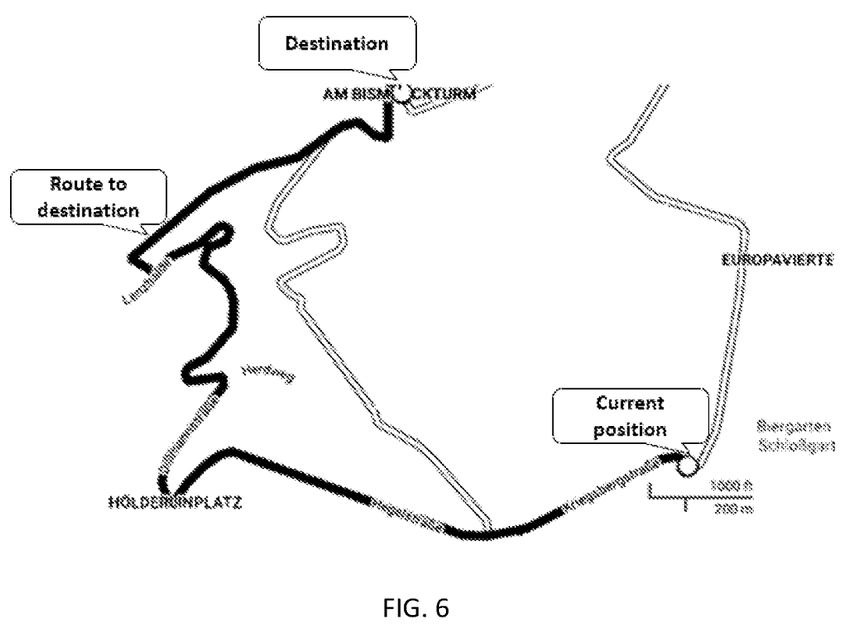
FIG. 6 illustrates an example of a map from a navigation application according to an exemplary embodiment.

FIG. 6 illustrates an example of a map from a navigation application running in a terminal device according to an exemplary embodiment, wherein the map illustrates a route to a destination position from the current position of the terminal device. The current position may be determined for example with the global positioning system, GPS. For example, a user of the terminal device may enter a destination position desired by the user, and the navigation application then calculates the suggested route to that destination from the current position, as well as the estimated time of arrival at the destination. The user may then decide to follow the suggested route. The navigation application may be utilized to share one or more future position estimates, i.e. LFPI, along the route to a network entity, for example to a base station, such as a gNB, or to an LMF, in order to improve the connectivity between the terminal device and the network entity. For example, the network entity may be configured to predict a future position of the terminal device based on the one or more future position estimates provided by the terminal device, and to transmit a signal, for example a narrow beam signal, to the predicted future position of the terminal device at the time indicated by the corresponding timestamp, or at least approximately at the time indicated by the corresponding timestamp. In other words, the network entity may schedule its beam planning according to the one or more future position estimates instead of just reacting to current conditions, thus resulting in more efficient use of the resources of the network.

A technical advantage provided by some exemplary embodiments may be that they may improve performance in multiple network layers for example in a base station, such as a gNB, or an LMF. At the physical, PHY, layer, for example beam pre-management, beam tracking, cooperative beamforming, and/or channel adaptation may be improved. For example, a base station, such as a gNB, or an LMF may use the one or more future position estimates of the terminal device to perform beam tracking for the terminal device, which may enable for example beam adaptation schemes, handover, path selection, and/or radio link failure recovery procedures. In addition, some exemplary embodiments may improve predictive channel estimation schemes, which may be beneficial for example in link adaptation.

At the medium access control, MAC, layer, for example pre-scheduling, handovers, and/or network slicing may be improved. For example, a base station, such as a gNB, or an LMF may predict one or more handovers based on the one or more future position estimates of the terminal device, so that the one or more handovers may be prepared ahead of time without a need to track the instantaneous channel. The one or more handovers may be predicted by determining one or more cells where the terminal device is predicted to be in based on the one or more future position estimates. In addition, a base station, such as a gNB, or an LMF may perform overload control by predicting the network load in advance based on the current traffic profiles of a plurality of terminal devices and the future position estimates of the plurality of terminal devices. Furthermore, a base station, such as a gNB, or an LMF may optimize data buffering to manage the buffer of a video stream and/or other data streams by using the one or more future position estimates of the terminal device and estimating the network performance in different positions. Thus, service outages in signal black spots, i.e. positions with poor network performance, may be prevented by predicting in advance that the terminal device will be in such a black spot, and transmitting the needed data in advance to the terminal device. Similarly, MAC scheduling may also be improved by knowing the radio map and the one or more future position estimates of a terminal device. For example, a base station, such as a gNB, or an LMF may wait until the terminal device is in a position with a stronger channel gain, if the delay budget allows it. Moreover, networks with low power communications may also benefit from the future position estimates of terminal devices. For example, low power non orthogonal multiple access, NOMA, schemes may need to know which terminal devices are close in space in order to assign proper spreading sequences to them. Such schemes may use the future position estimates to run clustering and/or spreading sequence assignment algorithms in advance, thus allowing execution for example in an edge cloud.

At higher layers, more efficient pre-caching of data may be performed for example for streaming applications. In addition, signaling overhead and latency may be reduced. Furthermore, the accuracy of position estimation may be improved by combining the information of the LFPI for example with GPS information, radio-based localization, map matching, cameras, and/or measurements from one or more sensors, for example an inertial sensor.

Figure 7:
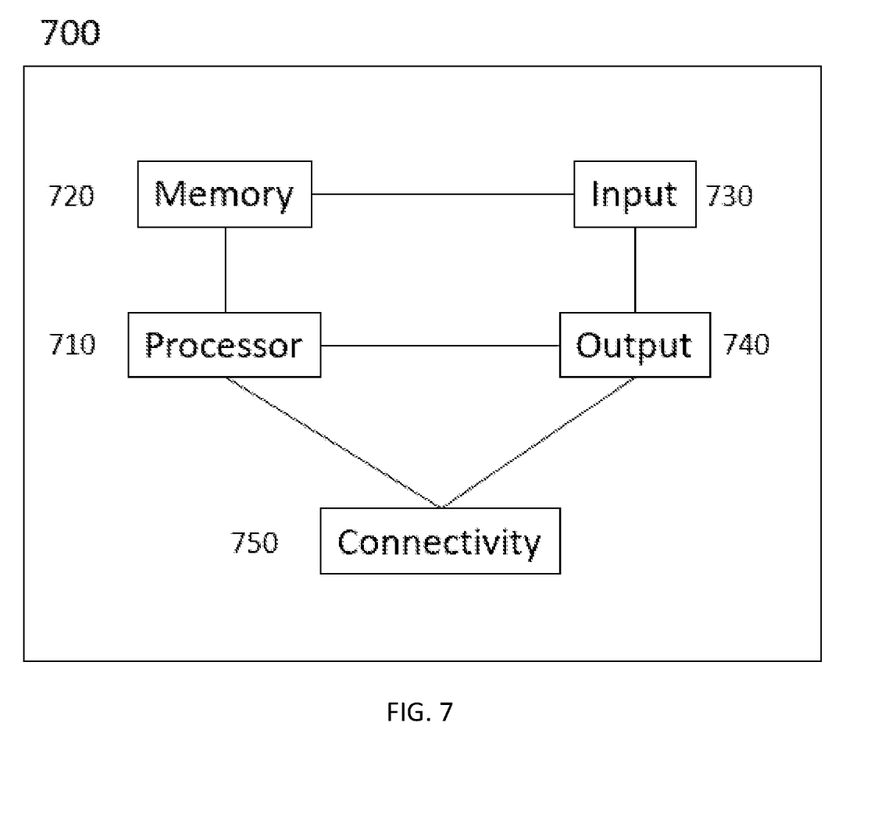
FIG. 7 and FIG. 8 illustrate apparatuses according to exemplary embodiments.

FIG. 7 illustrates an apparatus 700, which may be an apparatus such as, or comprised in, a terminal device, according to an exemplary embodiment. The apparatus 700 comprises a processor 710. The processor 710 interprets computer program instructions and processes data. The processor 710 may comprise one or more programmable processors. The processor 710 may comprise programmable hardware with embedded firmware and may, alternatively or additionally, comprise one or more application specific integrated circuits, ASICs.

The processor 710 is coupled to a memory 720. The processor is configured to read and write data to and from the memory 720. The memory 720 may comprise one or more memory units. The memory units may be volatile or non-volatile. It is to be noted that in some exemplary embodiments there may be one or more units of non-volatile memory and one or more units of volatile memory or, alternatively, one or more units of non-volatile memory, or, alternatively, one or more units of volatile memory. Volatile memory may be for example RAM, DRAM or SDRAM. Non-volatile memory may be for example ROM, PROM, EEPROM, flash memory, optical storage or magnetic storage. In general, memories may be referred to as non-transitory computer readable media. The memory 720 stores computer readable instructions that are execute by the processor 710. For example, non-volatile memory stores the computer readable instructions and the processor 710 executes the instructions using volatile memory for temporary storage of data and/or instructions.

The computer readable instructions may have been pre-stored to the memory 720 or, alternatively or additionally, they may be received, by the apparatus, via electromagnetic carrier signal and/or may be copied from a physical entity such as computer program product. Execution of the computer readable instructions causes the apparatus 700 to perform functionality described above.

In the context of this document, a "memory" or "computer-readable media" may be any non-transitory media or means that can contain, store, communicate, propagate or transport the instructions for use by or in connection with an instruction execution system, apparatus, or device, such as a computer.

The apparatus 700 further comprises, or is connected to, an input unit 730. The input unit 730 comprises one or more interfaces for receiving a user input. The one or more interfaces may comprise for example one or more motion and/or orientation sensors, one or more cameras, one or more accelerometers, one or more microphones, one or more buttons and one or more touch detection units. Further, the input unit 730 may comprise an interface to which external devices may connect to.

The apparatus 700 also comprises an output unit 740. The output unit comprises or is connected to one or more displays capable of rendering visual content such as a light emitting diode, LED, display, a liquid crystal display, LCD and a liquid crystal on silicon, LCoS, display. The output unit 740 may comprise two displays to render stereoscopic visual content. One display to render content to the left eye and the other display to render content to the right eye. The output unit 740 may further comprise a transmission unit, such as one or more waveguides or one or more lenses, to transfer the rendered visual content to the user's field of view. The output unit 740 further comprises one or more audio outputs. The one or more audio outputs may be for example loudspeakers or a set of headphones.

The apparatus 700 may further comprise a connectivity unit 750. The connectivity unit 750 enables wired and/or wireless connectivity to external networks. The connectivity unit 750 may comprise one or more antennas and one or more receivers that may be integrated to the apparatus 700 or the apparatus 700 may be connected to. The connectivity unit 750 may comprise an integrated circuit or a set of integrated circuits that provide the wireless communication capability for the apparatus 700. Alternatively, the wireless connectivity may be a hardwired application specific integrated circuit, ASIC.

It is to be noted that the apparatus 700 may further comprise various component not illustrated in FIG. 7. The various components may be hardware component and/or software components.

Figure 8:
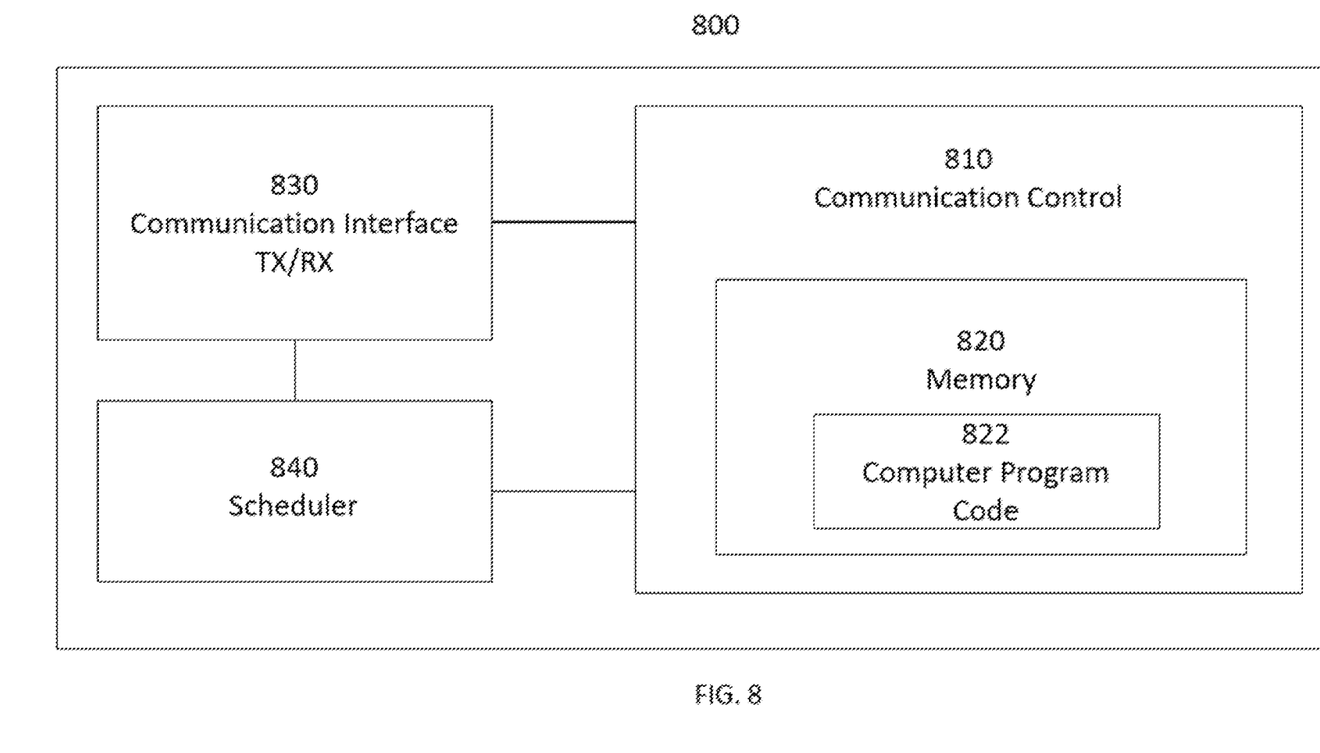

The apparatus 800 of FIG. 8 illustrates an exemplary embodiment of an apparatus that may be a base station or be comprised in a base station. The apparatus may be, for example, a circuitry or a chipset applicable to a base station to realize the described exemplary embodiments. The apparatus 800 may be an electronic device comprising one or more electronic circuitries. The apparatus 800 may comprise a communication control circuitry 810 such as at least one processor, and at least one memory 820 including a computer program code (software) 822 wherein the at least one memory and the computer program code (software) 822 are configured, with the at least one processor, to cause the apparatus 800 to carry out any one of the exemplary embodiments of the access node described above.

The memory 820 may be implemented using any suitable data storage technology, such as semiconductor-based memory devices, flash memory, magnetic memory devices and systems, optical memory devices and systems, fixed memory and removable memory. The memory may comprise a configuration database for storing configuration data. For example, the configuration database may store current neighbour cell list, and, in some exemplary embodiments, structures of the frames used in the detected neighbour cells.

The apparatus 800 may further comprise a communication interface 830 comprising hardware and/or software for realizing communication connectivity according to one or more communication protocols. The communication interface 830 may provide the apparatus with radio communication capabilities to communicate in the cellular communication system. The communication interface may, for example, provide a radio interface to terminal devices. The apparatus 800 may further comprise another interface towards a core network such as the network coordinator apparatus and/or to the access nodes of the cellular communication system. The apparatus 800 may further comprise a scheduler 840 that is configured to allocate resources.

As used in this application, the term "circuitry" may refer to one or more or all of the following:
  a. hardware-only circuit implementations (such as implementations in only analog and/or digital circuitry) and
  b. combinations of hardware circuits and software, such as (as applicable):
    i. a combination of analog and/or digital hardware circuit(s) with software/firmware and
    ii. any portions of hardware processor(s) with software (including digital signal processor(s)), software, and memory(ies) that work together to cause an apparatus, such as a mobile phone, to perform various functions) and
  c. hardware circuit(s) and or processor(s), such as a microprocessor(s) or a portion of a microprocessor(s), that requires software (for example firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The techniques and methods described herein may be implemented by various means. For example, these techniques may be implemented in hardware (one or more devices), firmware (one or more devices), software (one or more modules), or combinations thereof. For a hardware implementation, the apparatus(es) of exemplary embodiments may be implemented within one or more application-specific integrated circuits (ASICs), digital signal processors (DSPs), digital signal processing devices (DSPDs), programmable logic devices (PLDs), field programmable gate arrays (FPGAs), graphics processing units (GPUs), processors, controllers, micro-controllers, microprocessors, other electronic units designed to perform the functions described herein, or a combination thereof. For firmware or software, the implementation can be carried out through modules of at least one chipset (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

It will be obvious to a person skilled in the art that, as technology advances, the inventive concept may be implemented in various ways. The embodiments are not limited to the exemplary embodiments described above, but may vary within the scope of the claims. Therefore, all words and expressions should be interpreted broadly, and they are intended to illustrate, not to restrict, the exemplary embodiments.

The invention claimed is:

1. An apparatus, comprising:
at least one processor; and
at least one memory including computer program code, wherein the at least one memory and the computer program code are configured, with the at least one processor, to cause the apparatus to:
obtain a plurality of future position estimates of a terminal device;
transmit the plurality of future position estimates to a base station or to a location management function;
wherein the plurality of future position estimates are transmitted in a message comprising a list of a plurality of pairs of a timestamp and an estimated future position at a time indicated by the timestamp,
wherein the message further comprises an integer indicating a number of list elements comprised in the list, and
wherein the plurality of future position estimates comprise at least a direction and a distance of the terminal device for beam selection for the terminal device.

2. The apparatus according to claim 1, wherein the plurality of future position estimates extend at least 5 seconds into the future.

3. The apparatus according to claim 1, wherein the plurality of future position estimates are obtained based at least partly on information obtained from a navigation application or measurements from one or more sensors.

4. The apparatus according to claim 1, wherein the plurality of future position estimates are obtained based at least partly on a probability indicating how likely a user is to follow the plurality of future position estimates.

5. The apparatus according to claim 1, wherein the plurality of future position estimates further comprise at least a geographic longitude and latitude position.

6. The apparatus according to claim 1, further comprising periodically updating the plurality of future position estimates and transmitting the updated plurality of future position estimates.

7. The apparatus according to claim 1, wherein the apparatus is the terminal device, for which the plurality of future position estimates are obtained.

8. An apparatus, comprising:
at least one processor; and
at least one memory including computer program code, wherein the at least one memory and the computer program code are configured, with the at least one processor, to cause the apparatus to:
receive a plurality of future position estimates of a terminal device, wherein the plurality of future position estimates are received in a message comprising a list of a plurality of pairs of a timestamp and an estimated future position at a time indicated by the timestamp, wherein the message further comprises an integer indicating a number of list elements comprised in the list, and wherein the plurality of future position estimates comprise at least a direction and a distance of the terminal device for beam selection for the terminal device; and
predict a future position of the terminal device based on the plurality of future position estimates.

9. The apparatus according to claim 8, wherein the at least one memory and computer program code are further configured, with the at least one processor, to cause the apparatus to transmit, using a selected beam, a signal to the predicted future position of the terminal device approximately at the time indicated by the timestamp, or predicting one or more handovers associated with the terminal device based on the predicted future position of the terminal device.

10. The apparatus according to claim 8, wherein the apparatus comprises a base station or a location management function.

11. A system, comprising:
a terminal device; and
a network entity;
wherein the terminal device is configured to:
obtain a plurality of future position estimates of the terminal device; and
transmit the plurality of future position estimates to the network entity in a message comprising a list of a plurality of pairs of a timestamp and an estimated future position at a time indicated by the timestamp, wherein the message further comprises an integer indicating a number of list elements comprised in the list, and wherein the plurality of future position estimates comprise at least a direction and a distance of the terminal device for beam selection for the terminal device;
wherein the network entity is configured to:
receive the plurality of future position estimates transmitted by the terminal device; and
predict a future position of the terminal device based on the plurality of future position estimates.

12. The system according to claim 11, wherein the network entity is further configured to transmit, using a selected beam, a signal to the predicted future position of the terminal device approximately at the time indicated by the timestamp, or to predict one or more handovers associated with the terminal device based on the predicted future position of the terminal device.

13. A method, comprising:
obtaining a plurality of future position estimates of a terminal device;
transmitting the plurality of future position estimates to a base station or to a location management function;
wherein the plurality of future position estimates are transmitted in a message comprising a list of a plurality of pairs of a timestamp and an estimated future position at a time indicated by the timestamp;
wherein the message further comprises an integer indicating a number of list elements comprised in the list, and
wherein the plurality of future position estimates comprise at least a direction and a distance of the terminal device for beam selection for the terminal device.

14. The method according to claim 13, wherein the plurality of future position estimates extend at least 5 seconds into the future.

15. The method according to claim 13, wherein the plurality of future position estimates are obtained based at least partly on information obtained from a navigation application or measurements from one or more sensors.

16. The method according to claim 13, wherein the plurality of future position estimates are obtained based at least partly on a probability indicating how likely a user is to follow the plurality of future position estimates.

17. The method according to claim 13, wherein the plurality of future position estimates further comprise at least a geographic longitude and latitude position.

18. The method according to claim 13, further comprising periodically updating the plurality of future position estimates and transmitting the updated plurality of future position estimates.

19. The method according to claim 13, wherein the method is performed by terminal device, for which the plurality of future position estimates are obtained.

\* \* \* \* \*